(12) United States Patent
Hsiao et al.

(10) Patent No.: US 12,438,253 B2
(45) Date of Patent: Oct. 7, 2025

(54) WIRELESS DONGLE

(71) Applicant: CHENG UEI PRECISION INDUSTRY CO., LTD., New Taipei (TW)

(72) Inventors: Lan-Yung Hsiao, New Taipei (TW); Ping-Chun Lu, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 78 days.

(21) Appl. No.: 18/608,910

(22) Filed: Mar. 18, 2024

(65) Prior Publication Data

US 2024/0387978 A1   Nov. 21, 2024

(30) Foreign Application Priority Data

May 19, 2023   (CN) .......................... 202321220292.0

(51) Int. Cl.
*H01Q 1/22* (2006.01)
*H01Q 1/36* (2006.01)
*H05K 1/16* (2006.01)

(52) U.S. Cl.
CPC ............. *H01Q 1/2275* (2013.01); *H01Q 1/36* (2013.01); *H05K 1/16* (2013.01); *H05K 2201/10098* (2013.01)

(58) Field of Classification Search
CPC ........ H01Q 1/22; H01Q 1/2275; H01Q 1/243; H01Q 1/36; H01Q 9/04; H01Q 9/0407; G06F 13/385; G06F 13/4282; G06F 2213/0042; H05K 1/16; H05K 2201/10098

See application file for complete search history.

(56) References Cited

U.S. PATENT DOCUMENTS

| | | | | |
|---|---|---|---|---|
| 6,337,666 B1 * | 1/2002 | Bishop | ..................... | H01Q 9/40 |
| | | | | 343/702 |
| 8,618,986 B2 * | 12/2013 | Lan | ........................ | H01Q 5/364 |
| | | | | 343/702 |
| 9,461,365 B2 * | 10/2016 | Iellici | ....................... | H01Q 1/48 |
| 9,844,149 B2 * | 12/2017 | Cariou | ..................... | H01Q 9/42 |
| 2006/0264178 A1 * | 11/2006 | Noble | ...................... | H04K 3/46 |
| | | | | 455/67.11 |
| 2007/0229366 A1 * | 10/2007 | Kim | ........................ | H01Q 9/42 |
| | | | | 343/846 |
| 2013/0027264 A1 * | 1/2013 | Chua | ..................... | H05K 5/0278 |
| | | | | 343/789 |

* cited by examiner

*Primary Examiner* — Thai Pham
(74) *Attorney, Agent, or Firm* — Cheng-Ju Chiang

(57) ABSTRACT

A wireless dongle includes a circuit board, a connector disposed to a front of the circuit board, a wireless module and a printed antenna. The circuit board has a first front edge, a first rear edge, a first lateral edge, and a second lateral edge opposite to the first lateral edge. The circuit board has a first surface, and a second surface opposite to the first surface. The wireless module is disposed to a middle and one side of the first surface which is adjacent to the first lateral edge. The wireless module is disposed to a middle and one side of the second surface. The printed antenna is disposed at the other side of the first surface and the other side of the second surface which are adjacent to the second lateral edge. The wireless module is electrically connected between the connector and the printed antenna.

8 Claims, 5 Drawing Sheets

WIRELESS DONGLE

CROSS REFERENCE TO RELATED APPLICATIONS

The present application is based on, and claims priority from, China Patent Application No. 202321220292.0, filed May 19, 2023, the disclosure of which is hereby incorporated by reference herein in its entirety.

BACKGROUND OF THE INVENTION

Field of the Invention

The present invention generally relates to a wireless dongle, and more particularly to a wireless dongle having a printed antenna with a compact layout.

Description of Related Art

In recent years, various mobile devices gradually tend to be wireless under an era period of a rapid development of mobile communication. Simultaneously, users pursue mobile devices and peripheral devices which are convenient to be carried, so the mobile devices and the peripheral devices which are lighter, thinner and smaller become a market mainstream. The mobile devices and the peripheral devices are developed towards miniaturized sizes, take a wireless dongle for example, a size of the wireless dongle is getting smaller and smaller, so an antenna set inside the wireless dongle must be reduced accordingly. As a result, a demand for the antenna that is able to work stably in provided frequency bands and has a smaller size is increased.

Therefore, it is necessary to provide a wireless dongle having a printed antenna with a compact layout, the wireless dongle works in a limited space, and the wireless dongle is able to stably work in a predetermined frequency band.

BRIEF SUMMARY OF THE INVENTION

An object of the present invention is to provide a wireless dongle having a compact layout of a printed antenna. The wireless dongle includes a circuit board, a connector, a wireless module and a printed antenna. The circuit board has a first front edge, a first rear edge opposite to the first front edge, a first lateral edge, and a second lateral edge opposite to the first lateral edge. The circuit board has a first surface, and a second surface opposite to the first surface. The connector is disposed to a middle of a front of the circuit board, and a front of the connector projects beyond a middle of the first front edge of the circuit board. The wireless module is disposed to a middle and one side of the first surface of the circuit board which is adjacent to the first lateral edge. The wireless module is disposed to a middle and one side of the second surface of the circuit board which is adjacent to the first lateral edge of the circuit board. The wireless module is electrically connected to the connector. The printed antenna is disposed at the other side of the first surface and the other side of the second surface of the circuit board which are adjacent to the second lateral edge of the circuit board. The wireless module is electrically connected between the connector and the printed antenna. The printed antenna is arranged away from the connector. The printed antenna has a through hole penetrating through the first surface, and the second surface of the circuit board; a feed-in section, a first radiation section, a second radiation section, a grounding section and a through hole. The feed-in section is disposed at the first surface of the circuit board. The feed-in section is positioned close to the first rear edge and the second lateral edge of the circuit board. The feed-in section is connected to a lateral rear corner of the wireless module of the first surface of the circuit board which is adjacent to the printed antenna. The first radiation section is disposed at the first surface of the circuit board. The first radiation section is straightly extended sideward to the through hole from the feed-in section, then is straightly extended frontward and is extended close to the first front edge of the circuit board, later is straightly extended sideward and close to the second lateral edge of the circuit board and is straightly extended rearward and close to the first rear edge of the circuit board, and is finally slantwise arched rearward and opposite to the second lateral edge of the circuit board. An extending path of a front portion of the first radiation section forms in an inverted U shape. The second radiation section is disposed at the second surface of the circuit board. The second radiation section is straightly extended frontward and close to the first front edge of the circuit board, then is straightly extended sideward and opposite to the second lateral edge of the circuit board from the through hole. An extending path of the second radiation section forming in an inverted L shape. The grounding section is disposed at the second surface of the circuit board. The grounding section is disposed at a tail side of the second radiation section. The grounding section is close to the first front edge of the circuit board. The grounding section is connected to a lateral front corner of the wireless module of the second surface of the circuit board which is adjacent to the printed antenna. The through hole is electrically connected to the first radiation section and the second radiation section. The through hole is disposed at a lateral rear position of the circuit board which is adjacent to the first rear edge and the second lateral edge of the circuit board. The first radiation section keeps a first clearance from the first front edge of circuit board. The first radiation section keeps the first clearance from the first rear edge of the circuit board. The first radiation section keeps the first clearance from the second lateral edge of the circuit board.

Another object of the present invention is to provide a wireless dongle. The wireless dongle includes a circuit board, a connector, a wireless module and a printed antenna. The circuit board has a first front edge, a first rear edge opposite to the first front edge, a first lateral edge, and a second lateral edge opposite to the first lateral edge. The circuit board has a first surface, and a second surface opposite to the first surface. The connector is disposed to a middle of a front of the circuit board, and a front of the connector projects beyond a middle of the first front edge of the circuit board. The wireless module is disposed to a middle and one side of the first surface of the circuit board which is adjacent to the first lateral edge. The wireless module is electrically connected to the connector. The printed antenna is disposed at the other side of the first surface and the other side of the second surface of the circuit board which are adjacent to the second lateral edge of the circuit board. The wireless module is electrically connected between the connector and the printed antenna. The printed antenna is arranged away from the connector. The printed antenna has a through hole penetrating through the first surface and the second surface of the circuit board; a feed-in section disposed at the first surface of the circuit board, a first radiation section disposed at the first surface of the circuit board, a second radiation section, a grounding section and a through hole. The feed-in section is positioned close to the first rear edge and the second lateral edge of the circuit board. The feed-in section is connected to a lateral rear corner of the wireless module of the first surface of the circuit board which is adjacent to the printed antenna. The first radiation section is straightly extended sideward to the through hole from the feed-in section, then is straightly extended frontward and is extended close to the first front edge of the circuit board, later is straightly extended sideward and close to the second lateral edge of the circuit board and is straightly extended rearward and close to the first rear edge of the circuit board, and is finally slantwise arched rearward and opposite to the second lateral edge of the circuit board. An extending path of a front portion of the first radiation section forms in an inverted U shape. The second radiation section is disposed at the second surface of the circuit board. An extending path of the second radiation section is formed in an inverted L shape. The second radiation section having a first extending section and a second extending section. The first extending section is straightly extended frontward and close to the first front edge of the circuit board from the through hole. The second extending section is straightly extended sideward and opposite to the second lateral edge of the circuit board from a front of the first extending section. The grounding section is disposed at the second surface of the circuit board. The grounding section is disposed at a tail end of the second radiation section. The grounding section is close to the first front edge of the circuit board. The through hole is disposed at a lateral rear position of the circuit board which is adjacent to the first rear edge and the second lateral edge of the circuit board. The through hole is electrically connected to the first radiation section and the second radiation section. A second rear edge of the first radiation section is spaced from the first rear edge of the circuit board by a first clearance, a second front edge of the first radiation section is spaced from the first front edge of the circuit board by the first clearance, an outer side edge of the first radiation section is spaced from the second lateral edge of the circuit board by the first clearance.

Another object of the present invention is to provide a wireless dongle. The wireless dongle includes a circuit board, a connector, a wireless module and a printed antenna. The circuit board has a first front edge, a first rear edge opposite to the first front edge, a first lateral edge, and a second lateral edge opposite to the first lateral edge. The circuit board has a first surface, and a second surface opposite to the first surface. The connector is disposed to a middle of a front of the circuit board, and a front of the connector projects beyond a middle of the first front edge of the circuit board. The wireless module is disposed to a middle and one side of the first surface of the circuit board which is adjacent to the first lateral edge. The wireless module is disposed to a middle and one side of the second surface of the circuit board which is adjacent to the first lateral edge. The wireless module is electrically connected to the connector. The printed antenna is disposed at the other side of the first surface and the other side of the second surface of the circuit board which are adjacent to the second lateral edge of the circuit board. The wireless module is electrically connected between the connector and the printed antenna. The printed antenna is arranged away from the connector, the wireless module having a first wireless unit being disposed to a lateral front corner of the wireless module which is adjacent to the printed antenna. The printed antenna has a feed-in section, a first radiation section, a second radiation section, a grounding section and a through hole. The feed-in section is disposed at the first surface of the circuit board. The feed-in section is positioned close to the first rear edge and the second lateral edge of the circuit board. The feed-in section is connected to a lateral rear corner of the wireless module of the first surface of the circuit board which is adjacent to the printed antenna. The first radiation section is disposed at the first surface of the circuit board. The first radiation section is extended sideward to the through hole from the feed-in section, then is extended frontward and is extended close to the first front edge of the circuit board, later is extended sideward and close to the second lateral edge of the circuit board and is extended rearward and close to the first rear edge of the circuit board. The second radiation section is disposed at the second surface of the circuit board. The second radiation section having a first extending section and a second extending section. The first extending section is extended frontward and close to the first front edge of the circuit board from the through hole. The second extending section is extended sideward and opposite to the second lateral edge of the circuit board from a front of the first extending section. The grounding section is disposed at the second surface of the circuit board. The grounding section is disposed at a tail end of the second radiation section. The grounding section is close to the first front edge of the circuit board. The grounding section is connected to a lateral front corner of the wireless module of the second surface of the circuit board which is adjacent to the printed antenna, the grounding section being close to the first wireless unit. The through hole is disposed at a lateral rear position of the circuit board which is adjacent to the first rear edge and the second lateral edge of the circuit board. The through hole is electrically connected to the first radiation section and the second radiation section.

As described above, the wireless dongle has the compact layout of the printed antenna, so the printed antenna of the wireless dongle works in a limited space, and the printed antenna of the wireless dongle is able to stably work in a predetermined frequency band. As a result, the wireless dongle is adapted to a miniaturization development trend of electronic products, and a wireless development trend of the electronic products.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
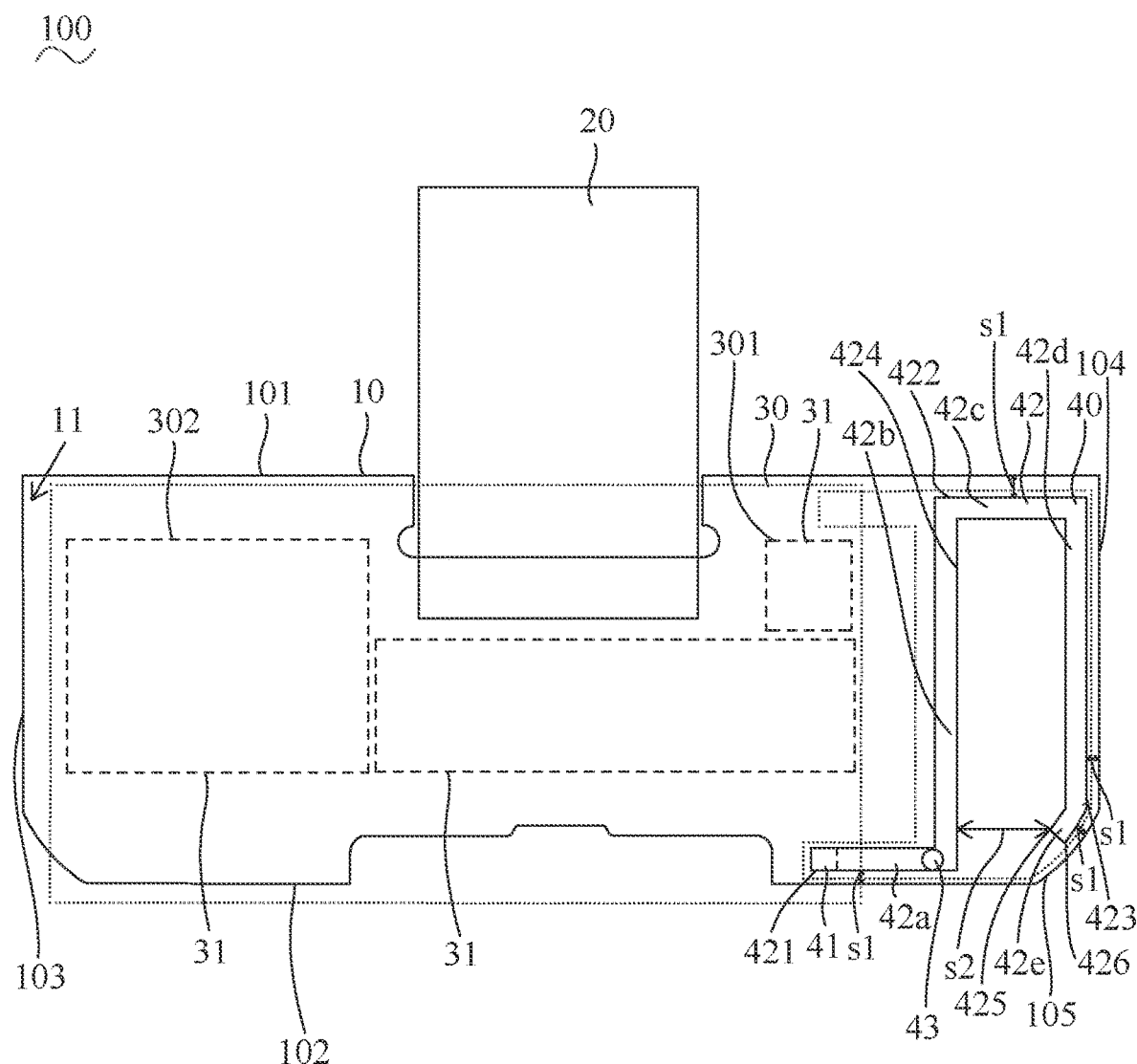
FIG. 1 is a top diagram of a wireless dongle according to a preferred embodiment of the present invention.
Figure 2:
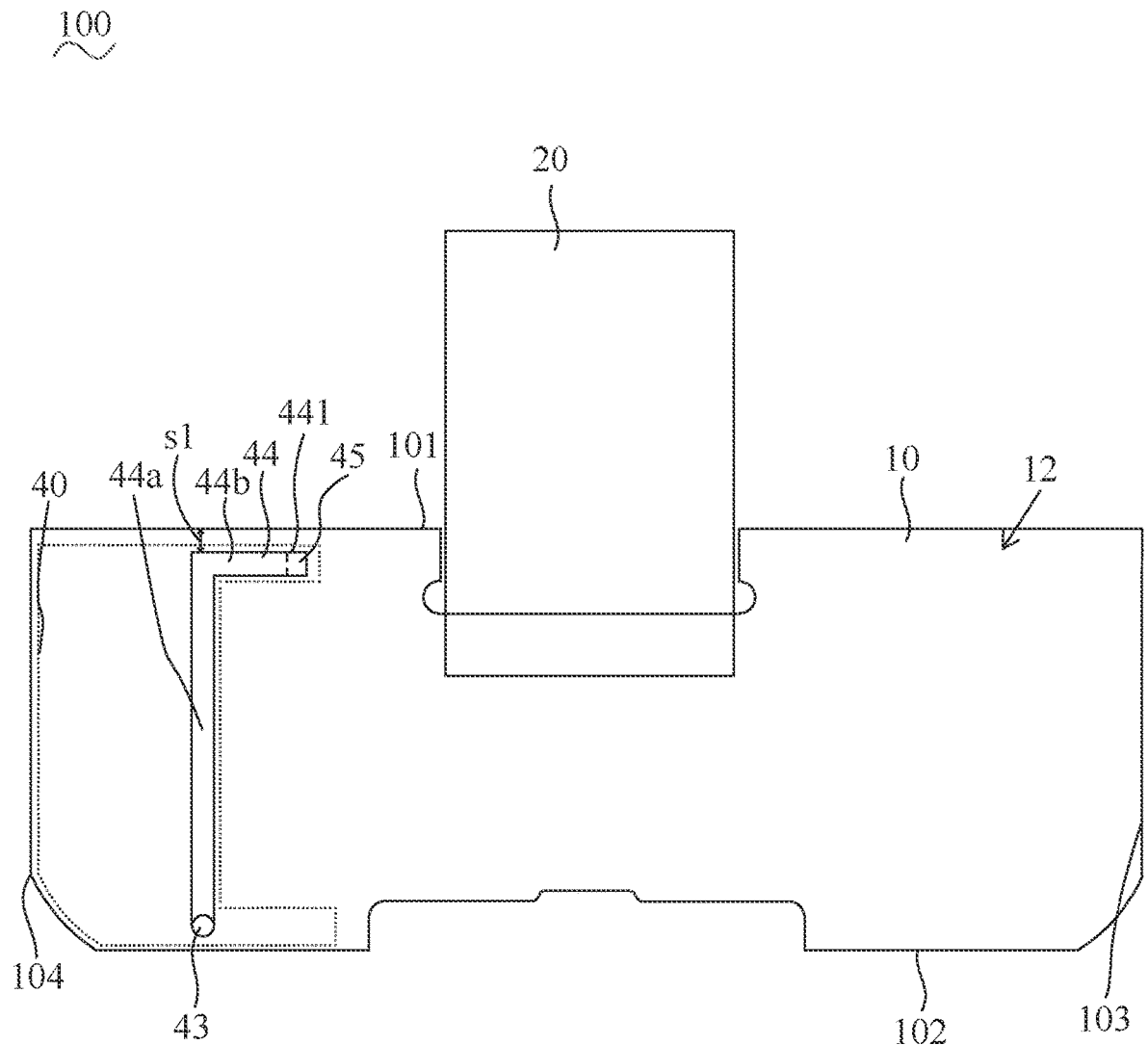
FIG. 2 is a bottom diagram of the wireless dongle according to the preferred embodiment of the present invention.

Referring to FIG. 1 and FIG. 2, a wireless dongle 100 according to a preferred embodiment of the present invention is shown. The wireless dongle 100 includes a circuit board 10, a connector 20, a wireless module 30 and a printed antenna 40. The connector 20, the wireless module 30 and the printed antenna 40 are all mounted to the circuit board 10. The connector 20 is electrically connected to the wireless module 30, and the wireless module 30 is electrically connected to the printed antenna 40. In order to describe conveniently, a frontward direction of the wireless dongle 100 in the following description is defined as a direction which is towards an upper position of a view shown in FIG. 1, and a rearward direction of the wireless dongle 100 in the following description is defined as a direction which is towards a lower position of the view shown in FIG. 1.

Referring to FIG. 1 and FIG. 2 again, the circuit board 10 is substantially formed in a rectangular shape. The circuit board 10 has two opposite long edges and two opposite short edges. The circuit board 10 has a first front edge 101, a first rear edge 102 opposite to the first front edge 101, a first lateral edge 103, and a second lateral edge 104 opposite to the first lateral edge 103. The first lateral edge 103 is connected between two sides of the first front edge 101 and the first rear edge 102, and the second lateral edge 104 is connected between the other two sides of the first front edge 101 and the first rear edge 102. A junction between the first rear edge 102 and the second lateral edge 104 of the circuit board 10 is defined as a connecting edge 105 which is shown as an arc shape. In this preferred embodiment, the first front edge 101 and the first rear edge 102 of the circuit board 10 are the two opposite long edges. The first lateral edge 103 and the second lateral edge 104 of the circuit board 10 are the two opposite short edges. The circuit board 10 has a first surface 11, and a second surface 12 opposite to the first surface 11.

The connector 20 is disposed to a middle of a front of the circuit board 10, and a front of the connector 20 projects beyond a middle of the first front edge 101 of the circuit board 10. The wireless module 30 is electrically connected between the connector 20 and the printed antenna 40. The wireless module 30 is disposed to a middle and one side of the first surface 11 of the circuit board 10 which is adjacent to the first lateral edge 103 of the circuit board 10. The wireless module 30 is disposed between the printed antenna 40 and the first lateral edge 103 of the circuit board 10. The wireless module 30 is disposed to a middle and one side of the second surface 12 of the circuit board 10 which is adjacent to the first lateral edge 103 of the circuit board 10. The printed antenna 40 is disposed between the wireless module 30, and the second lateral edge 104 of the circuit board 10. The wireless module 30 is electrically connected to the connector 20. The printed antenna 40 is arranged away from the connector 20. The printed antenna 40 is disposed at the other side of the first surface 11 and the other side of the second surface 12 of the circuit board 10 which are adjacent to the second lateral edge 104 of the circuit board 10.

After a user inserts the wireless dongle 100 into a mobile device (not shown), the mobile device is able to proceed with wireless communication via the wireless dongle 100. The mobile device is a notebook or a smart phone. In this preferred embodiment, a metal shell of the connector 20 affects characteristics of the printed antenna 40, such as a voltage standing wave ratio, and a field pattern and reflection loss, a distance between the mobile device and the printed antenna 40, and a distance between the mobile device and the metal shell of the connector 20 all affect the characteristics of the printed antenna 40, so under a premise that a layout of the printed antenna 40 is cooperated with a layout of the wireless module 30, the layout of the printed antenna 40 need be far away from the metal shell of the connector 20 and the mobile device.

The wireless module 30 is able to be a Bluetooth module or a 2.4 GHz module. The wireless module 30 contains a plurality of circuits 31 to proceed with data transmission and data conversion, and the plurality of the circuits 31 are selected from a group consisting of micro-controllers, filters and sensors. The plurality of the circuits 31 are able to be the micro-controllers, the filters, the sensors, different type circuits, or different type components, etc. A quantity of the circuits 31 shown in FIG. 1 is only schematic, and the quantity of the circuits 31 should be without being limited to the quantity of the circuits 31 which is shown in FIG. 1. The plurality of the circuits 31 include a first wireless unit 301 and a plurality of second wireless units 302. The first wireless unit 301 is disposed to a lateral front corner of the wireless module 30 which is adjacent to the printed antenna 40. A rear of the connector 20 is disposed to a front of the wireless module 30. In this preferred embodiment, the plurality of the circuits 31 are disposed between the connector 20 and the printed antenna 40. The plurality of the circuits 31 surround the rear of the connector 20. The first wireless unit 301 and the plurality of the second wireless units 302 surround the rear of the connector 20. The first wireless unit 301 provides current to the printed antenna 40.

The printed antenna 40 is a monopole antenna. The printed antenna 40 is a planar inverted-F antenna. The printed antenna 40 has a feed-in section 41 and a first radiation section 42, a through hole 43, a second radiation section 44 and a grounding section 45. The through hole 43 is disposed at a lateral rear position of the circuit board 10 which is adjacent to the first rear edge 102 and the second lateral edge 104 of the circuit board 10. The through hole 43 penetrates through the first surface 11 and the second surface 12 of the circuit board 10. The through hole 43 is electrically connected to the feed-in section 41, the first radiation section 42 and the second radiation section 44. The feed-in section 41 and the first radiation section 42 are both disposed at the first surface 11 of the circuit board 10. The second radiation section 44 and the grounding section 45 are disposed at the second surface 12 of the circuit board 10.

The feed-in section 41 is positioned close to the first rear edge 102 and the second lateral edge 104 of the circuit board 10. The feed-in section 41 is electrically connected to a lateral rear corner of the wireless module 30 of the first surface 11 of the circuit board 10 which is adjacent to the printed antenna 40. The first radiation section 42 is extended sideward and away from the first lateral edge 103 of the circuit board 10 from the feed-in section 41. The first radiation section 42 is close to the first front edge 101, the first rear edge 102 and the second lateral edge 104 of the circuit board 10. The second radiation section 44 is extended frontward from the through hole 43. The grounding section 45 is disposed at a tail end of the second radiation section 44. The grounding section 45 is close to the first front edge 101 of the circuit board 10.

The first radiation section 42 keeps a first clearance s1 from the first front edge 101 of circuit board 10. The first radiation section 42 keeps the first clearance s1 from the first rear edge 102 of the circuit board 10. The first radiation section 42 keeps the first clearance s1 from the second lateral edge 104 of the circuit board 10. An extending path of a front portion of the first radiation section 42 forms in a substantially inverted U shape. Two facing surfaces of two rear ends of the substantially inverted U-shaped front portion of the first radiation section 42 are separated by a second clearance s2. A tail end of the first radiation section 42 is located at a lateral rear corner of the circuit board 10 which is adjacent to the first rear edge 102 and the second lateral edge 104 of the circuit board 10. The tail end of the first radiation section 42 is close to the connecting edge 105 of the circuit board 10. The second clearance s2 is greater than the first clearance s1.

Referring to FIG. 1 and FIG. 2, a specific structure of the first radiation section 42 is described as follows. The first radiation section 42 is straightly extended sideward to the through hole 43 from the feed-in section 41 along the first rear edge 102 of the circuit board 10, then is straightly extended frontward and is extended close to the first front edge 101 of the circuit board 10, later is straightly extended sideward and close to the second lateral edge 104 of the circuit board 10 and is straightly extended rearward and close to the first rear edge 102 of the circuit board 10, and is finally slantwise arched rearward and opposite to the second lateral edge 104 of the circuit board 10.

The first radiation section 42 includes a first zone 42a, a second zone 42b, a third zone 42c, a fourth zone 42d and a fifth zone 42e. The first zone 42a is straightly extended sideward to the through hole 43 from the feed-in section 41. The second zone 42b is straightly extended frontward and is extended close to the first front edge 101 of the circuit board 10 from one end of the first zone 42a which is close to the second lateral edge 104 of the circuit board 10. The through hole 43 is positioned at a junction between the first zone 42a and the second zone 42b. The third zone 42c is straightly extended sideward and close to the second lateral edge 104 of the circuit board 10 from a front of the second zone 42b. The fourth zone 42d is straightly extended rearward and close to the first rear edge 102 of the circuit board 10 from one end of the third zone 42c which is adjacent to the first front edge 101 and the second lateral edge 104 of the circuit board 10. The fifth zone 42e is slantwise arched rearward and opposite to the second lateral edge 104 of the circuit board 10 from a rear of the fourth zone 42d.

A second rear edge 421 of the first zone 42a of the first radiation section 42 is spaced from the first rear edge 102 of the circuit board 10 by the first clearance s1. A second front edge 422 of the third zone 42c of the first radiation section 42 is spaced from the first front edge 101 of the circuit board 10 by the first clearance s1. An outer side edge 423 of the fourth zone 42d of the first radiation section 42 is spaced from the second lateral edge 104 of the circuit board 10 by the first clearance s1. A third lateral edge 424 of the second zone 42b which faces the fourth zone 42d is spaced from an inner rear corner 425 of the fifth zone 42e by the second clearance s2. An outer arc edge 426 of the fifth zone 42e is spaced from the connecting edge 105 of the circuit board 10 by the first clearance s1. The first zone 42a and the third zone 42c extend horizontally, and the first zone 42a and the third zone 42c are formed in rectangular strap shapes. An extending path of the first zone 42a is parallel to an extending path of the third zone 42c. The second zone 42b and the fourth zone 42d extend longitudinally, and the second zone 42b and the fourth zone 42d are formed in rectangular bar shapes. An extending path of the second zone 42b is parallel to an extending path of the fourth zone 42d.

Referring to FIG. 1 and FIG. 2, a specific structure of the second radiation section 44 is described as follows. The second radiation section 44 is straightly extended frontward and close to the first front edge 101 of the circuit board 10, then is straightly extended sideward and opposite to the second lateral edge 104 of the circuit board 10 from the through hole 43. An extending path of the second radiation section 44 is shown as an inverted L shape. The tail end of the second radiation section 44 is electrically connected to the grounding section 45. The second radiation section 44 includes a first extending section 44a and a second extending section 44b. The first extending section 44a is straightly extended frontward and close to the first front edge 101 of the circuit board 10 from the through hole 43. The second extending section 44b is straightly extended sideward and opposite to the second lateral edge 104 of the circuit board 10 from a front of the first extending section 44a.

A third front edge 441 of the second extending section 44b is spaced from the first front edge 101 of the circuit board 10 by the first clearance s1. The grounding section 45 is electrically connected to a grounding area of the wireless module 30 of the second surface 12 of the circuit board 10. The grounding section 45 is connected to the lateral front corner of the wireless module 30 of the second surface 12 of the circuit board 10 which is adjacent to the printed antenna 40.

According to the above-mentioned description configuration, the feed-in section 41, the first radiation section 42 and the second radiation section 44 of the printed antenna 40 are alternately transmitted, and electric fields and magnetic fields of the feed-in section 41, the first radiation section 42 and the second radiation section 44 of the printed antenna 40 are interacted to oscillate electromagnetic waves in a frequency band which is ranged from 2.4 GHz to 2.5 GHz band. In practice, the first clearance s1 is 0.2 mm. The second clearance s2 is approximately equal to the distance between the mobile device and the printed antenna 40, and the second clearance s2 is 3.6 mm.

When the printed antenna 40 of the wireless dongle 100 according to the present invention is used in wireless communication, a current from the wireless module 30 is fed by the feed-in section 41. The current passes through the first radiation section 42, and simultaneously, the current flows through the second radiation section 44 via the through hole 43, the electromagnetic waves in the frequency band which is ranged from 2.4 GHz to 2.5 GHz are oscillated. Thus, the printed antenna 40 of the wireless dongle 100 works in a limited space, and the printed antenna 40 of the wireless dongle 100 is able to stably work in a predetermined frequency band.

Figure 3:
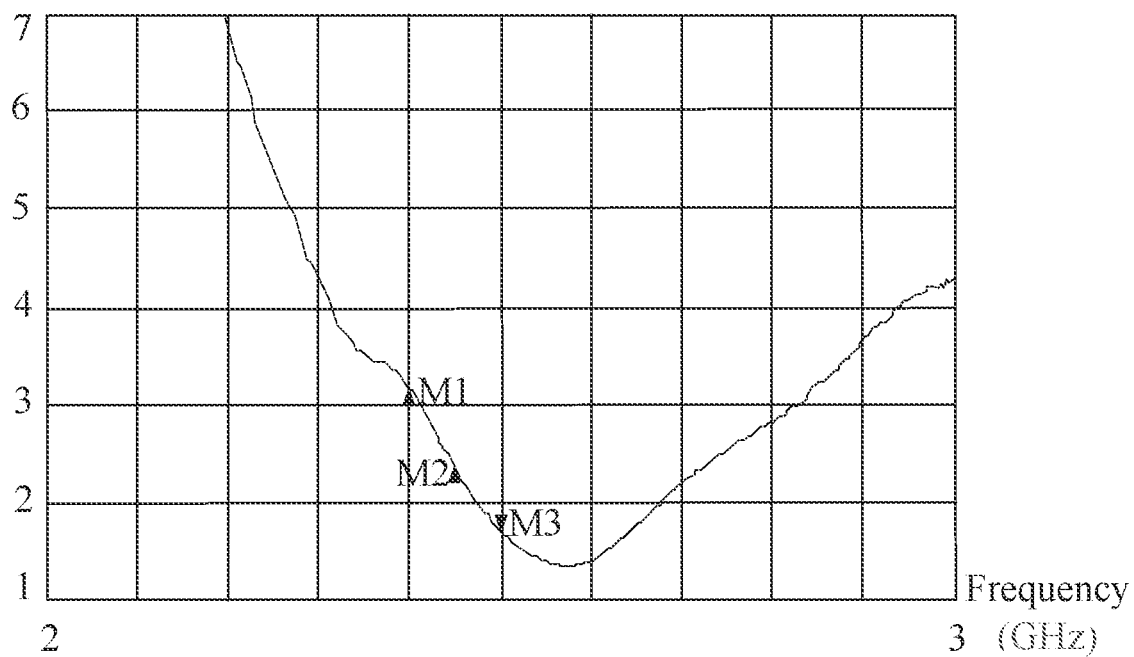
FIG. 3 is a voltage standing wave ratio (VSWR) chart of a printed antenna of the wireless dongle according to the preferred embodiment of the present invention.
Figure 4:
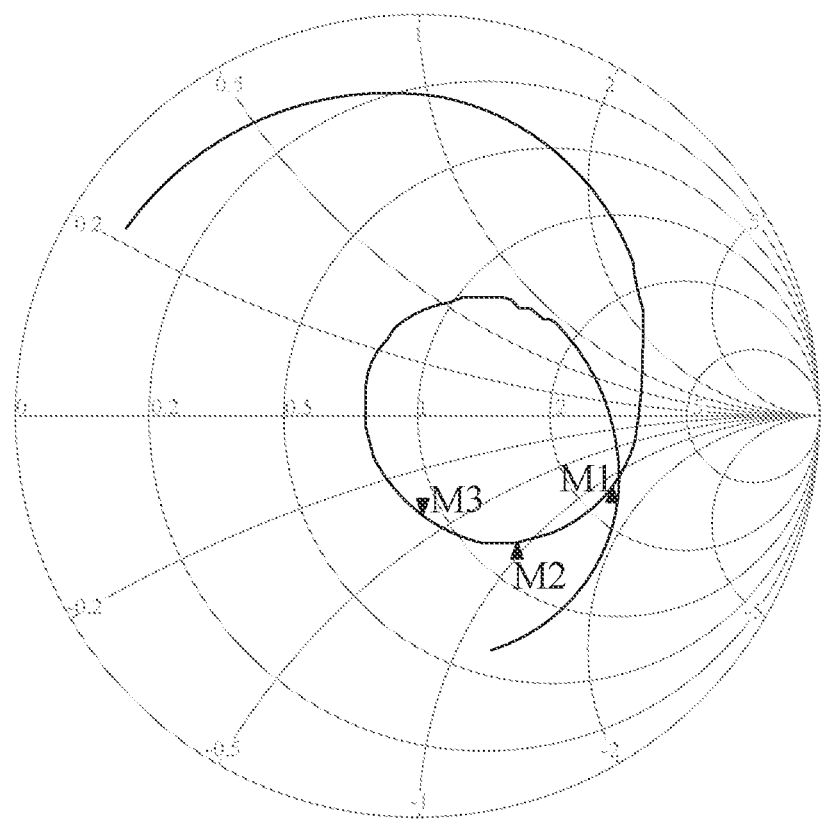
FIG. 4 is a smith chart of the printed antenna of the wireless dongle according to the preferred embodiment of the present invention.
Figure 5:
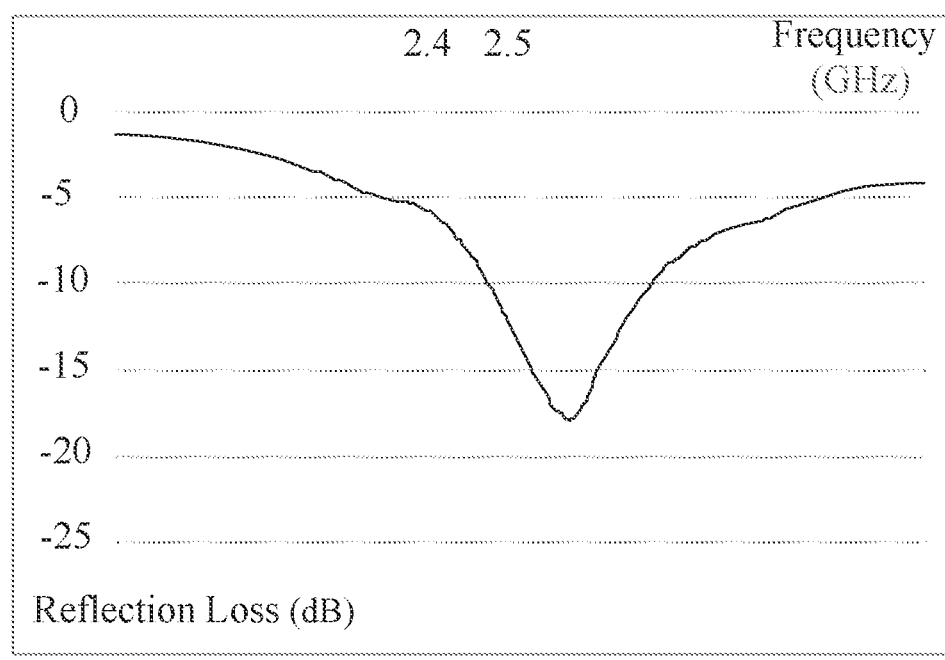
FIG. 5 is a return loss chart of the printed antenna of the wireless dongle according to the preferred embodiment of the present invention.

Referring to FIG. 1 to FIG. 4, a voltage standing wave ratio (VSWR) chart of the printed antenna 40 of the wireless dongle 100 according to the present invention is shown in FIG. 3. A smith chart of the printed antenna 40 of the wireless dongle 100 according to the present invention is shown in FIG. 4. When the printed antenna 40 is operated at 2.4 GHZ, a VSWR value of the printed antenna 40 is 3.1285 which is shown at a position M1 of FIG. 3 and FIG. 4. When the printed antenna 40 is operated at 2.45 GHZ, a VSWR value of the printed antenna 40 is 2.3179 which is shown at a position M2 of FIG. 3 and FIG. 4. When the printed antenna 40 is operated at 2.5 GHZ, a VSWR value of the printed antenna 40 is 1.6569 which is shown at a position M3 of FIG. 3 and FIG. 4. Therefore, the printed antenna 40 of the wireless dongle 100 according to the present invention is able to be stably operated in the frequency band which is ranged from 2.4 GHz to 2.5 GHZ.

Referring to FIG. 1 to FIG. 5, when the printed antenna 40 of the wireless dongle 100 is operated in the frequency band which is ranged from 2.4 GHz to 2.5 GHZ, a return loss of a bandwidth of the printed antenna 40 is roughly within -10 dB, a loss degree of the printed antenna 40 is small, and a radiation energy of the printed antenna 40 is large.

As described above, the wireless dongle 100 has the printed antenna 40 with the compact layout, so the printed antenna 40 of the wireless dongle 100 works in the limited space, and the printed antenna 40 of the wireless dongle 100 is able to stably work in the predetermined frequency band. As a result, the wireless dongle 100 is adapted to a miniaturization development trend of electronic products, and a wireless development trend of the electronic products.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. A wireless dongle, comprising:
   a circuit board having a first front edge, a first rear edge opposite to the first front edge, a first lateral edge, and a second lateral edge opposite to the first lateral edge, the circuit board having a first surface, and a second surface opposite to the first surface;
   a connector disposed to a middle of a front of the circuit board, and a front of the connector projecting beyond a middle of the first front edge of the circuit board;
   a wireless module disposed to a middle and one side of the first surface of the circuit board which is adjacent to the first lateral edge, the wireless module being disposed to a middle and one side of the second surface of the circuit board which is adjacent to the first lateral edge of the circuit board, the wireless module being electrically connected to the connector; and
   a printed antenna disposed at the other side of the first surface and the other side of the second surface of the circuit board which are adjacent to the second lateral edge of the circuit board, the wireless module being electrically connected between the connector and the printed antenna, the printed antenna being arranged away from the connector, the printed antenna having:
   a through hole penetrating through the first surface, and the second surface of the circuit board;
   a feed-in section disposed at the first surface of the circuit board, the feed-in section being positioned close to the first rear edge and the second lateral edge of the circuit board, the feed-in section being connected to a lateral rear corner of the wireless module of the first surface of the circuit board which is adjacent to the printed antenna;
   a first radiation section disposed at the first surface of the circuit board, the first radiation section being straightly extended sideward to the through hole from the feed-in section, then being straightly extended frontward and being extended close to the first front edge of the circuit board, later being straightly extended sideward and close to the second lateral edge of the circuit board and being straightly extended rearward and close to the first rear edge of the circuit board, and being finally slantwise arched rearward and opposite to the second lateral edge of the circuit board, an extending path of a front portion of the first radiation section forming in an inverted U shape;
   a second radiation section disposed at the second surface of the circuit board, the second radiation section being straightly extended frontward and close to the first front edge of the circuit board, then being straightly extended sideward and opposite to the second lateral edge of the circuit board from the through hole, an extending path of the second radiation section forming in an inverted L shape;
   a grounding section disposed at the second surface of the circuit board, the grounding section being disposed at a tail side of the second radiation section, the grounding section being close to the first front edge of the circuit board, the grounding section being connected to a lateral front corner of the wireless module of the second surface of the circuit board which is adjacent to the printed antenna; and
   the through hole being electrically connected to the first radiation section and the second radiation section, the through hole being disposed at a lateral rear position of the circuit board which is adjacent to the first rear edge and the second lateral edge of the circuit board;
   wherein the first radiation section keeps a first clearance from the first front edge of circuit board, the first radiation section keeps the first clearance from the first rear edge of the circuit board, the first radiation section keeps the first clearance from the second lateral edge of the circuit board.

2. The wireless dongle as claimed in claim 1, wherein the first radiation section includes a first zone straightly extended sideward to the through hole from the feed-in section, a second zone straightly extended frontward and extended close to the first front edge of the circuit board from a one end of the first zone which is close to the second lateral edge of the circuit board, a third zone straightly extended sideward and close to the second lateral edge of the circuit board from a front of the second zone, a fourth zone straightly extended rearward and close to the first rear edge of the circuit board from one end of the third zone which is adjacent to the first front edge and the second lateral edge of the circuit board, and a fifth zone slantwise arched rearward and opposite to the second lateral edge of the circuit board from a rear of the fourth zone, a second rear edge of the first zone of the first radiation section is spaced from the first rear edge of the circuit board by the first clearance, a second front edge of the third zone of the first radiation section is spaced from the first front edge of the circuit board by the first clearance, an outer side edge of the fourth zone of the first radiation section is spaced from the second lateral edge of the circuit board by the first clearance.

3. The wireless dongle as claimed in claim 2, wherein a junction between the first rear edge and the second lateral edge of the circuit board is defined as a connecting edge which is formed in an arc shape, an outer arc edge of the fifth zone is spaced from the connecting edge of the circuit board by the first clearance.

4. The wireless dongle as claimed in claim 2, wherein a third lateral edge of the second zone which faces the fourth zone is spaced from an inner rear corner of the fifth zone by a second clearance.

5. The wireless dongle as claimed in claim 2, wherein an extending path of the first zone is parallel to an extending path of the third zone, an extending path of the second zone is parallel to an extending path of the fourth zone.

6. The wireless dongle as claimed in claim 2, wherein the second radiation section includes a first extending section and a second extending section, the first extending section is straightly extended frontward and close to the first front edge of the circuit board from the through hole, the second extending section is straightly extended sideward and opposite to the second lateral edge of the circuit board from a front of the first extending section, a third front edge of the second extending section is spaced from the first front edge of the circuit board by the first clearance.

7. A wireless dongle, comprising:
a circuit board having a first front edge, a first rear edge opposite to the first front edge, a first lateral edge, and a second lateral edge opposite to the first lateral edge, the circuit board having a first surface, and a second surface opposite to the first surface;
a connector disposed to a middle of a front of the circuit board, and a front of the connector projecting beyond a middle of the first front edge of the circuit board;
a wireless module disposed to a middle and one side of the first surface of the circuit board which is adjacent to the first lateral edge, the wireless module being electrically connected to the connector; and
a printed antenna disposed at the other side of the first surface and the other side of the second surface of the circuit board which are adjacent to the second lateral edge of the circuit board, the wireless module being electrically connected between the connector and the printed antenna, the printed antenna being arranged away from the connector, the printed antenna having:
a through hole penetrating through the first surface and the second surface of the circuit board;
a feed-in section disposed at the first surface of the circuit board, the feed-in section being positioned close to the first rear edge and the second lateral edge of the circuit board, the feed-in section being connected to a lateral rear corner of the wireless module of the first surface of the circuit board which is adjacent to the printed antenna;
a first radiation section disposed at the first surface of the circuit board, the first radiation section being straightly extended sideward to the through hole from the feed-in section, then being straightly extended frontward and being extended close to the first front edge of the circuit board, later being straightly extended sideward and close to the second lateral edge of the circuit board and being straightly extended rearward and close to the first rear edge of the circuit board, and being finally slantwise arched rearward and opposite to the second lateral edge of the circuit board, an extending path of a front portion of the first radiation section forming in an inverted U shape;
a second radiation section disposed at the second surface of the circuit board, an extending path of the second radiation section being formed in an inverted L shape, the second radiation section having a first extending section and a second extending section, the first extending section being straightly extended frontward and close to the first front edge of the circuit board from the through hole, the second extending section being straightly extended sideward and opposite to the second lateral edge of the circuit board from a front of the first extending section;
a grounding section disposed at the second surface of the circuit board, the grounding section being disposed at a tail end of the second radiation section, the grounding section being close to the first front edge of the circuit board; and
the through hole being disposed at a lateral rear position of the circuit board which is adjacent to the first rear edge and the second lateral edge of the circuit board, the through hole being electrically connected to the first radiation section and the second radiation section;
wherein a second rear edge of the first radiation section is spaced from the first rear edge of the circuit board by a first clearance, a second front edge of the first radiation section is spaced from the first front edge of the circuit board by the first clearance, an outer side edge of the first radiation section is spaced from the second lateral edge of the circuit board by the first clearance.

8. A wireless dongle, comprising:
a circuit board having a first front edge, a first rear edge opposite to the first front edge, a first lateral edge, and a second lateral edge opposite to the first lateral edge, the circuit board having a first surface, and a second surface opposite to the first surface;
a connector disposed to a middle of a front of the circuit board, and a front of the connector projecting beyond a middle of the first front edge of the circuit board;
a wireless module disposed to a middle and one side of the first surface of the circuit board which is adjacent to the first lateral edge, the wireless module being disposed to a middle and one side of the second surface of the circuit board which is adjacent to the first lateral edge, the wireless module being electrically connected to the connector; and
a printed antenna disposed at the other side of the first surface and the other side of the second surface of the circuit board which are adjacent to the second lateral edge of the circuit board, the wireless module being electrically connected between the connector and the printed antenna, the printed antenna being arranged away from the connector, the wireless module having a first wireless unit being disposed to a lateral front corner of the wireless module which is adjacent to the printed antenna, the printed antenna having:
a feed-in section disposed at the first surface of the circuit board, the feed-in section being positioned close to the first rear edge and the second lateral edge of the circuit board, the feed-in section being connected to a lateral rear corner of the wireless module of the first surface of the circuit board which is adjacent to the printed antenna;
a through hole penetrating through the first surface and the second surface of the circuit board;
a first radiation section disposed at the first surface of the circuit board, the first radiation section being extended sideward to the through hole from the feed-in section, then being extended frontward and being extended close to the first front edge of the circuit board, later being extended sideward and close to the second lateral edge of the circuit board and being extended rearward and close to the first rear edge of the circuit board;
a second radiation section disposed at the second surface of the circuit board, the second radiation section having a first extending section and a second extending section, the first extending section being extended frontward and close to the first front edge of the circuit board from the through hole, the second extending section being extended sideward and opposite to the second lateral edge of the circuit board from a front of the first extending section;
a grounding section disposed at the second surface of the circuit board, the grounding section being disposed at a tail end of the second radiation section, the grounding section being close to the first front edge of the circuit board, the grounding section being connected to a lateral front corner of the wireless module of the second surface of the circuit board which is adjacent to the printed antenna, the grounding section being close to the first wireless unit; and the through hole being disposed at a lateral rear position of the circuit board which is adjacent to the first rear edge and the second lateral edge of the circuit board, the through hole being electrically connected to the first radiation section and the second radiation section.

* * * * *